US012665985B2

(12) United States Patent
Yanai et al.

(10) Patent No.: US 12,665,985 B2
(45) Date of Patent: Jun. 23, 2026

(54) CONTROL METHOD, PROJECTION SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventors: Kohei Yanai, Matsumoto (JP); Kota Takeuchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/040,107

(22) Filed: Jan. 29, 2025

(65) Prior Publication Data

US 2025/0247494 A1 Jul. 31, 2025

(30) Foreign Application Priority Data

Jan. 30, 2024 (JP) ................................. 2024-011737

(51) Int. Cl.
*H04N 5/74* (2006.01)
*G03B 21/14* (2006.01)
*G06T 3/40* (2006.01)

(52) U.S. Cl.
CPC ............... *H04N 5/74* (2013.01); *G03B 21/14* (2013.01); *G06T 3/40* (2013.01)

(58) Field of Classification Search
CPC ............. H04N 5/74; G03B 21/14; G06T 3/40
USPC ........................................................ 348/744
See application file for complete search history.

(56) References Cited

U.S. PATENT DOCUMENTS

| | | | |
|---|---|---|---|
| 9,046,355 B2 * | 6/2015 | Takabayashi | ........... G06T 7/521 |
| 10,989,993 B2 * | 4/2021 | Kurota | ................ H04N 9/3194 |
| 11,551,367 B2 * | 1/2023 | Shi | ........................ H04N 13/271 |
| 11,676,241 B2 * | 6/2023 | Yamauchi | ................. G06T 3/06 |
| | | | 345/585 |
| 11,743,436 B2 * | 8/2023 | Kurota | ................. H04N 9/3194 |
| | | | 353/69 |
| 11,792,335 B2 * | 10/2023 | Peng | .................... H04N 9/3185 |
| | | | 348/744 |
| 2012/0133954 A1 | 5/2012 | Takabayashi et al. | |

FOREIGN PATENT DOCUMENTS

JP 2011-047931 A 3/2011

* cited by examiner

*Primary Examiner* — Trang U Tran
(74) *Attorney, Agent, or Firm* — Dority & Manning, P.A.

(57) ABSTRACT

A control method includes: causing a light modulator provided in a projection device to draw a drawn image including a first part having a first number of pixels; causing the projection device to project the drawn image as a projection image onto the projection target; causing an image pickup device to pick up the projection image including a second part corresponding to the first part and thus acquire a picked-up image; and determining a minimum width of stripe pattern including a bright part or a dark part detectable by the image pickup device, based on the first number of pixels and a second number of pixels, which is a number of pixels of a part corresponding to the second part of the projection image included in the picked-up image.

10 Claims, 9 Drawing Sheets

CONTROL METHOD, PROJECTION SYSTEM, AND NON-TRANSITORY COMPUTER-READABLE STORAGE MEDIUM STORING PROGRAM

The present application is based on, and claims priority from JP Application Serial Number 2024-011737, filed Jan. 30, 2024, the disclosure of which is hereby incorporated by reference herein in its entirety.

BACKGROUND

1. Technical Field

The present disclosure relates to a control method, a projection system, and a non-transitory computer-readable storage medium storing a program.

2. Related Art

According to the related art, a technique of picking up, with a camera, an image of a pattern projected on a projection target by a projection device, and performing various processing based on the picked-up image picked up by the camera, is known.

For example, JP-A-2011-47931 discloses a measurement device that performs measurement based on a picked-up image of a subject onto which pattern light having a bright part and a dark part is projected.

JP-A-2011-47931 is an example of the related art.

However, when a user separately prepares a camera, the minimum width of the pattern light having a bright part and a dark part that can be identified by the camera changes depending on the performance of the camera, and therefore the minimum width needs to be determined and this processing takes time and effort.

SUMMARY

According to an aspect of the present disclosure, a control method for a projection system is provided, the projection system including a projection device that includes a light modulator including a plurality of pixels and that projects one or a plurality of stripe patterns including a bright part and a dark part onto a projection target, and an image pickup device that picks up an image of the one or the plurality of stripe patterns projected on the projection target, the control method including: causing the light modulator to draw a drawn image including a first part having a first number of pixels; causing the projection device to project the drawn image as a projection image onto the projection target; causing the image pickup device to pick up the projection image including a second part corresponding to the first part and thus acquire a picked-up image; and determining a minimum width of the bright part or the dark part detectable by the image pickup device, based on the first number of pixels and a second number of pixels, which is a number of pixels of a third part corresponding to the second part of the projection image included in the picked-up image.

According to another aspect of the present disclosure, a projection system includes: a projection device that includes a light modulator including a plurality of pixels and that projects one or a plurality of stripe patterns including a bright part and a dark part onto a projection target; and an image pickup device that picks up an image of the one or the plurality of stripe patterns projected on the projection target, wherein the light modulator draws a drawn image including a first part having a first number of pixels, the projection device projects the drawn image as a projection image onto the projection target, the image pickup device picks up the projection image including a second part corresponding to the first part and thus acquires a picked-up image, and a minimum width of the bright part or the dark part detectable by the image pickup device is determined, based on the first number of pixels and a second number of pixels, which is a number of pixels of a third part corresponding to the second part of the projection image included in the picked-up image.

According to still another aspect of the present disclosure, a non-transitory computer-readable storage medium storing a program is provided, the program causing a processor installed in a projection device that includes a light modulator including a plurality of pixels and that projects one or a plurality of stripe patterns including a bright part and a dark part onto a projection target, to execute: causing the light modulator to draw a drawn image including a first part having a first number of pixels; projecting the drawn image as a projection image onto the projection target; acquiring, from an image pickup device, a picked-up image formed by picking up the projection image including a second part corresponding to the first part; and determining a minimum width of the bright part or the dark part detectable by the image pickup device, based on the first number of pixels and a second number of pixels, which is a number of pixels of a third part corresponding to the second part of the projection image included in the picked-up image.

BRIEF DESCRIPTION OF THE DRAWINGS

FIG. 1 is a block diagram illustrating a system configuration of a projection system.

FIG. 2 is a diagram showing a pattern image drawn on a liquid crystal panel.

DESCRIPTION OF EMBODIMENTS

1. Configuration of Projection System

Figure 1:
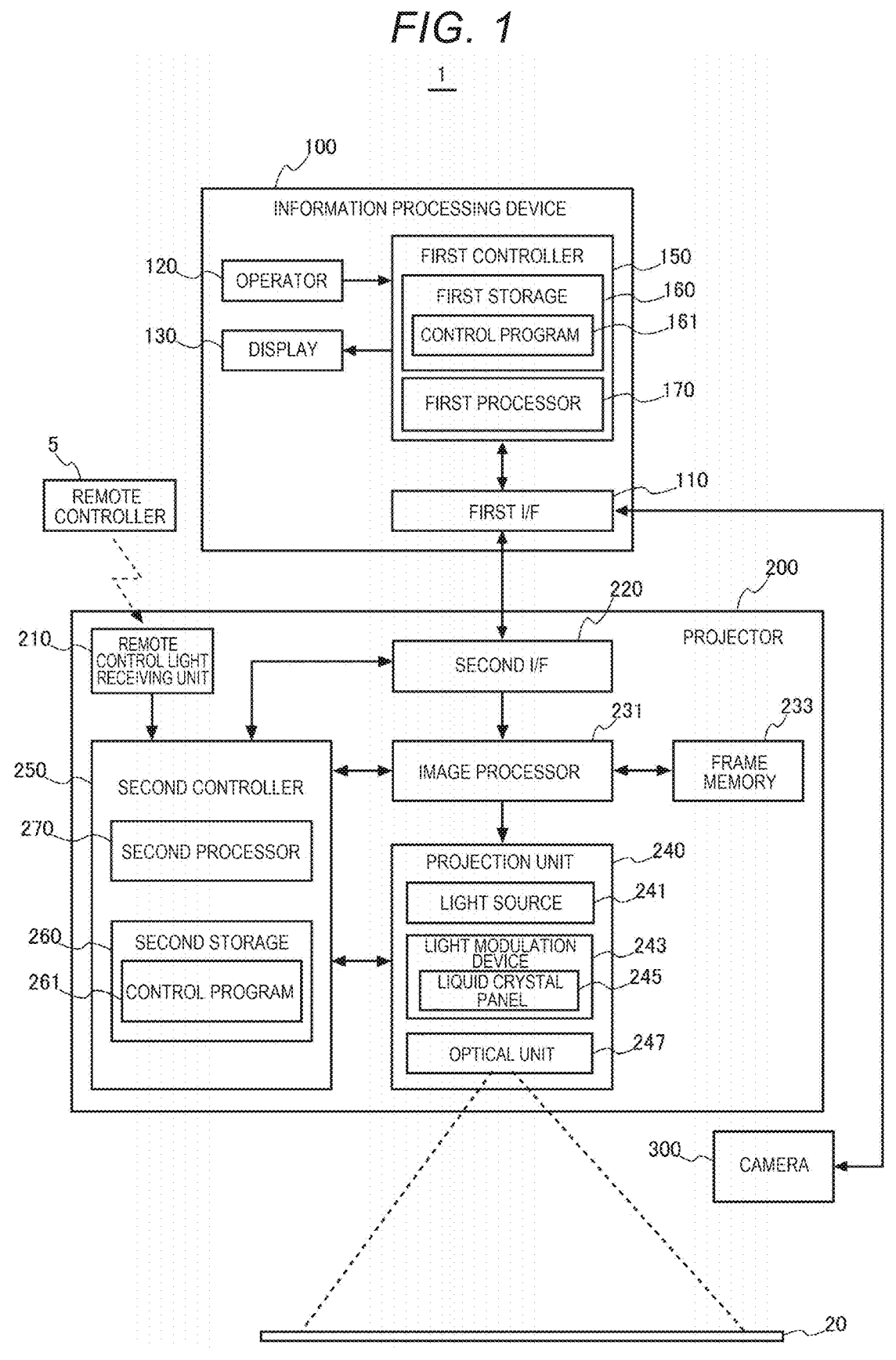
Figure 3:
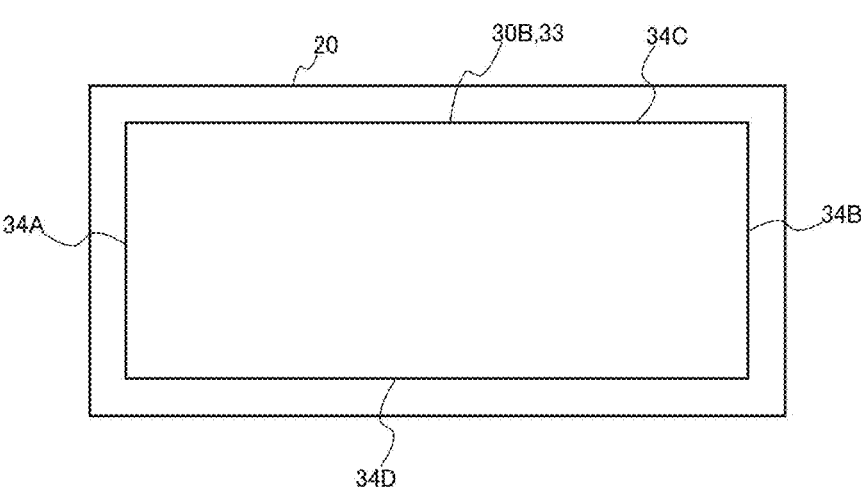
FIG. 3 is a diagram showing a pattern image projected on a projection target.

FIG. 1 is a diagram illustrating the system configuration of a projection system 1.

The projection system 1 includes an information processing device 100, a projector 200, and a camera 300. The projector 200 and the camera 300 are connected to the information processing device 100. Although FIG. 1 shows an example in which the projector 200 and the camera 300 are connected to the information processing device 100 via a wire, the connection between the information processing device 100, and the projector 200 and the camera 300, may be a connection by wireless communication such as Bluetooth or Wi-Fi. Bluetooth and Wi-Fi are registered trademarks. The projector 200 is equivalent to a projection device. The camera 300 is equivalent to an image pickup device.

2. Configuration of Information Processing Device

The information processing device 100 is configured with, for example, a desktop or laptop personal computer. The information processing device 100 may be a smartphone or a tablet terminal.

The information processing device 100 includes a first interface 110, an operator 120, a display 130, and a first controller 150. Hereinafter, the first interface 110 is abbreviated as the first I/F 110.

The first I/F 110 includes, for example, a connection terminal conforming to a standard such as HDMI (High-Definition Multimedia Interface) or USB (Universal Serial Bus), and an I/F circuit. HDMI is a registered trademark. The connection terminal and the I/F circuit are not shown in the illustration.

The first I/F 110 is-connected via a wire to the camera 300 and the projector 200, which are external devices, and transmits and receives data to and from the connected external devices. The first I/F 110 may include a communication antenna to establish a connection with an external device by wireless communication.

The operator 120 includes, for example, an operation device such as a mouse or a keyboard, and functions as an acceptor that accepts a user's operation.

The display 130 includes, for example, a display panel such as a liquid crystal panel or an organic EL (electroluminescence) panel. The display panel is not shown in the illustration. The display 130 displays an image based on image data input from the first controller 150, on the display panel.

The first controller 150 is a computer device including a first storage 160 and a first processor 170.

The first storage 160 includes a volatile memory such as a RAM (random-access memory) and a nonvolatile memory such as a ROM (read-only memory). In addition, the first storage 160 may include an auxiliary storage device such as an SSD (solid-state drive) or an HDD (hard disk drive).

The RAM is used for temporarily storing various data and the like, and the ROM stores a control program 161 used for controlling the operation of the information processing device 100.

The first processor 170 is an arithmetic processing device including a CPU (central processing unit) or an MPU (micro-processing unit). The first processor 170 may be configured with a single processor or a plurality of processors. The first processor 170 may be configured with a SoC (system-on-a-chip) integrated with a part or the entirety of the first storage 160 or another circuit. The first processor 170 may be configured with a combination of a CPU executing a program and a DSP (digital signal processor) executing predetermined arithmetic processing. Also, all of the functions of the first processor 170 may be implemented in hardware or may be configured using a programmable device.

3. Configuration of Projector

The projector 200 includes a remote control light receiver 210, a second interface 220, an image processor 231, a frame memory 233, a projection unit 240, and a second controller 250. Hereinafter, the second interface 220 is referred to as the second I/F 220.

The remote control light receiver 210 receives an infrared signal transmitted from a remote controller 5. The remote control light receiver 210 is, for example, a photodiode. The remote controller 5 includes a plurality of operation buttons for operating the projector 200, and functions as an acceptor that accepts a user's operation. The remote controller 5 transmits an infrared signal corresponding to the operation button operated by the user to the projector 200. The remote control light receiver 210 decodes the received infrared signal and generates an operation signal corresponding to the received infrared signal. The remote control light receiver 210 outputs the generated operation signal to the second controller 250.

The second I/F 220 includes, for example, a connection terminal and an I/F circuit. The connection terminal and the I/F circuit are not shown in the illustration. The second I/F 220 is connected via a wire to the information processing device 100, which is an external device, and transmits and receives data to and from the connected information processing device 100. The second I/F 220 may include a communication antenna to establish a connection with an external device by wireless communication.

The frame memory 233 is coupled to the image processor 231. The image processor 231 loads the image data input from the second I/F 220 into the frame memory 233. The frame memory 233 is configured with, for example, an SDRAM (synchronous dynamic random-access memory).

The image processor 231 performs image processing such as resolution conversion processing, resize processing, distortion correction, shape correction processing, digital zoom processing, and adjustment of the color tone and luminance of the image, on the image data loaded in the frame memory 233. The image processor 231 executes image processing designated by the second controller 250 and performs the processing using a parameter input from the second controller 250, according to need. Also, the image processor 231 can perform a combination of a plurality of kinds of image processing, of the foregoing kinds of image processing. The image processor 231 reads the processed image data from the frame memory 233, and outputs the read image data to the light modulation device 243 of the projection unit 240.

The image processor 231 and the frame memory 233 are configured with, for example, an integrated circuit. The integrated circuit includes an LSI (large-scale integrated circuit), an ASIC (application-specific integrated circuit), a PLD (programmable logic device), an FPGA (field-programmable gate array), a SoC (system-on-a-chip) and the like. A part of the configuration of the integrated circuit may include an analog circuit, and the second controller 250 and the integrated circuit may be combined together.

The projection unit 240 includes a light source 241, a light modulation device 243, and an optical unit 247.

The light source 241 includes a lamp such as a halogen lamp, a xenon lamp, or an ultra-high-pressure mercury lamp, or a solid-state light source such as an LED (light-emitting diode) or a laser light source.

The light modulation device 243 modulates the light emitted by the light source. The specific configuration of the light modulation device 243 is not limited. For example, the light modulation device 243 can be configured with a transmission-type liquid crystal panel, a reflection-type liquid crystal panel, or a digital micromirror device. In the present embodiment, a case where the light modulation device 243 includes the liquid crystal panel 245 of the transmission type is described.

The optical unit 247 includes, for example, a projection lens such as a focus lens for focus adjustment and a zoom lens for zoom adjustment. The projection lens is not shown in the illustration. The optical unit 247 causes the projection lens to form an image of the image light emitted from the light modulation device 243, on a projection target 20. Thus, an image based on the image light is projected in an enlarged form on the projection target 20.

The second controller 250 is a computer device including a second storage 260 and a second processor 270.

The second storage 260 includes a volatile memory such as RAM and a nonvolatile memory such as ROM. The RAM is used for temporarily storing various data and the like, and the ROM stores a control program 261 used for controlling the operation of the projector 200 and various setting information.

The second processor 270 is an arithmetic processing device including a CPU and an MPU. The second processor 270 executes the control program 261 to control each part of the projector 200. The second processor 270 may be configured with a single processor or a plurality of processors. The second processor 270 may be configured with a SoC integrated with a part or the entirety of the second storage 260 or another circuit. The second processor 270 may be configured with a combination of a CPU that executes a program and a DSP that executes predetermined arithmetic processing. Also all of the functions of the second processor 270 may be implemented in hardware or may be configured using a programmable device.

4. Configuration of Camera

The camera 300 is equivalent to an image pickup device, and includes a capture lens, an image pickup element such as a CCD (charge-coupled device) or a CMOS (complementary MOS), and a data processing circuit. The capture lens, the image pickup element, and the data processing circuit are not shown in the illustration. The camera 300 captures an image over a range including at least the projection target 20 in response to an instruction from the information processing device 100, and thus generates a captured image. The camera 300 outputs the generated captured image to the information processing device 100.

5. Operation of Projection System

The first controller 150 of the information processing device 100 finds the correspondence relationship between the image pickup pixels of the image pickup element of the externally connected camera 300 and the panel pixels of the liquid crystal panel 245 provided in the projector 200, using the gray code method. More specifically, a transformation matrix for transforming image pickup coordinates set in a picked-up image 50 picked up by the camera 300 into panel coordinates of the liquid crystal panel 245 of the projector 200 is found.

At this time, before a gray code pattern of the gray code method is projected on the projection target 20, the minimum bit width of a bright part or a dark part of the gray code pattern, which is detectable based on the picked-up image 50 picked up by the camera 300, is found in advance. Thus, a gray code pattern that cannot be detected by the camera 300 is not projected onto the projection target 20, and the processing time is thus reduced. When it is determined that the resolution of the camera 300 is excessively high and it takes time to detect the gray code pattern, a guidance is displayed to the user to reduce the resolution of the camera 300. The gray code pattern is equivalent to one or a plurality of stripe patterns.

First, the first controller 150 transmits pattern image data to the projector 200. The pattern image data represents, for example, an image formed entirely in a single color such as white or black. In the present embodiment, a case where the pattern image data is entirely white image data. Also, the first controller 150 acquires information about the panel resolution of the liquid crystal panel 245 from the projector 200, and stores the acquired information about the panel resolution in the first storage 160.

Figure 2:
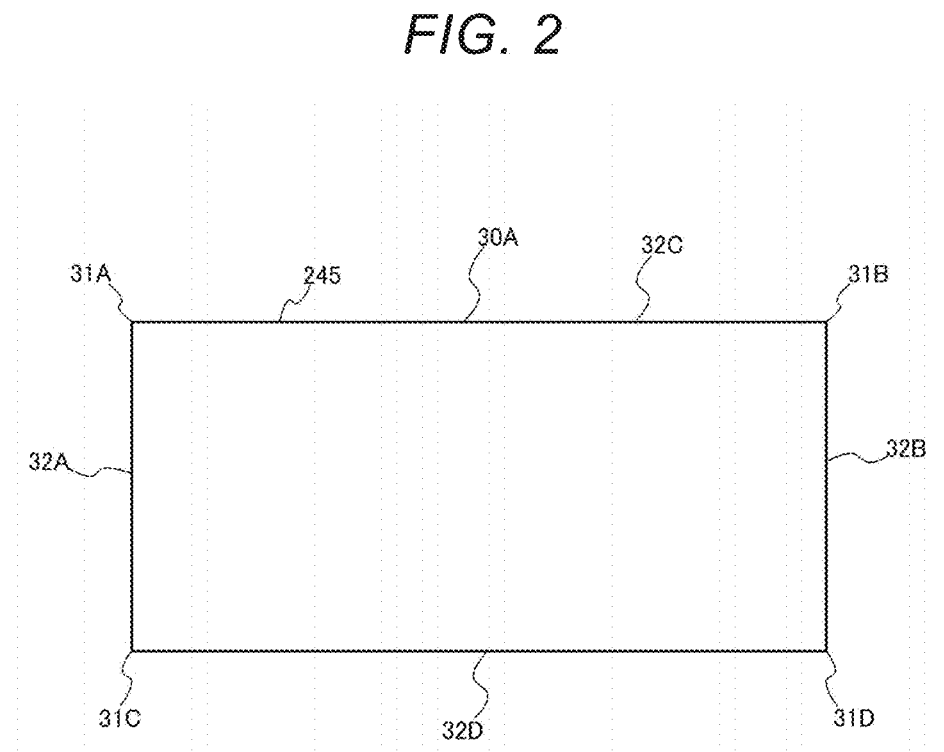

FIG. 2 shows a drawn image 30A drawn on the liquid crystal panel 245 provided in the projector 200. FIG. 3 shows a pattern image 30B projected on the projection target 20 by the projector 200.

Upon receiving the pattern image data from the information processing device 100, the second controller 250 of the projector 200 draws the received pattern image data on the liquid crystal panel 245 and thus generates the drawn image 30A. The light emitted from the light source 241 is transmitted through the liquid crystal panel 245 to generate image light, and the generated image light is projected onto the projection target 20 through the projection lens. Thus, the pattern image 30B based on the pattern image data is projected onto the projection target 20 as a projection image 33. The pattern image 30B is equivalent to a first image having only a first color.

The second controller 250 draws a pattern image based on the pattern image data on the entire surface of the liquid crystal panel 245 and thus forms the drawn image 30A on the entire surface of the liquid crystal panel 245.

In FIG. 2, the four vertices of the liquid crystal panel 245 as viewed in the illustration are referred to as a top left vertex 31A, a top right vertex 31B, a bottom left vertex 31C, and a bottom right vertex 31D.

A side of the liquid crystal panel 245 connecting the top left vertex 31A and the top right vertex 31B as viewed in the illustration is referred to as a top side 32C.

A side of the liquid crystal panel 245 connecting the bottom left vertex 31C and the bottom right vertex 31D as viewed in the illustration is referred to as a bottom side 32D.

A side of the liquid crystal panel 245 connecting the top left vertex 31A and the bottom left vertex 31C as viewed in the illustration is referred to as a left side 32A.

A side of the liquid crystal panel 245 connecting the top right vertex 31B and the bottom right vertex 31D as viewed in the illustration is referred to as a right side 32B.

When the second controller 250 draws the pattern image 30B based on the pattern image data on the entire surface of the liquid crystal panel 245, the top side 32C or the bottom side 32D of the liquid crystal panel 245 or the left side 32A or the right side 32B of the liquid crystal panel 245 is equivalent to a first part. The number of pixels of the top side 32C or the bottom side 32D, or the left side 32A or the right side 32B, is equivalent to a first number of pixels.

In FIG. 3, a side 34C forming the pattern image 30B is referred to as the top side 34C, and a side 34D forming the pattern image 30B is referred to as the bottom side 34D, as viewed in the illustration. Also, a side 34A forming the pattern image 30B is referred to as the left side 34A, and a side 34B forming the pattern image 30B is referred to as the right side 34B, as viewed in the illustration.

When the top side 32C or the bottom side 32D of the liquid crystal panel 245 or the left side 32A or the right side 32B of the liquid crystal panel 245 is equivalent to the first part, the top side 34C or the bottom side 34D of the pattern image 30B or the left side 34A or the right side 34B of the pattern image 30B is equivalent to a second part corresponding to the first part.

Figure 4:
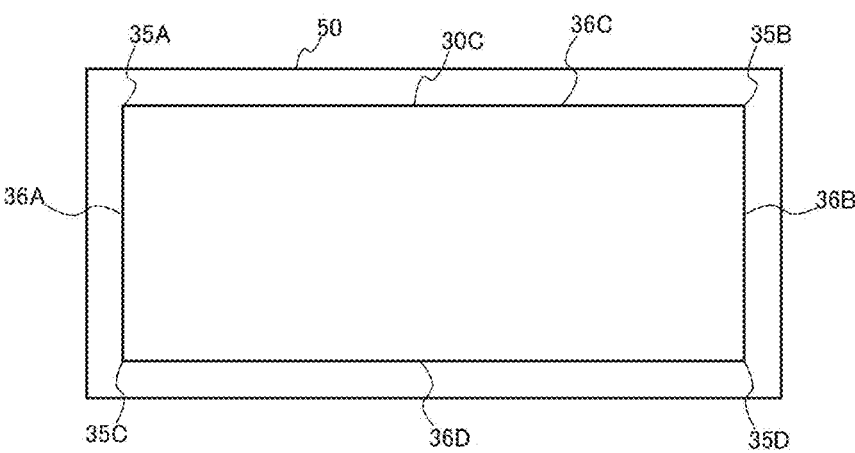
FIG. 4 is a diagram showing a picked-up image picked up by a camera.

FIG. 4 shows the picked-up image 50 picked up by the camera 300.

Next, the first controller 150 causes the camera 300 to pick up the projection target 20 and receives the picked-up image 50 picked up by the camera 300, from the camera 300. The picked-up image 50 includes an area where the pattern image 30B projected on the projection target 20 by the projector 200 is picked up. The area in the picked-up image 50 where the pattern image 30B is picked up is referred to as a pattern area 30C.

The first controller 150 detects the pattern area 30C from the acquired picked-up image 50. The top left vertex of the pattern area 30C is referred to as a top left vertex 35A, the top right vertex is referred to as a top right vertex 35B, the bottom left vertex is referred to as a bottom left vertex 35C, and the bottom right vertex is referred to as a bottom right vertex 35D. A side connecting the top left vertex 35A and the top right vertex 35B as viewed in the illustration is referred to as a top side 36C, and a side connecting the bottom left vertex 35C and the bottom right vertex 35D is referred to as a bottom side 36D. A side connecting the top left vertex 35A and the bottom left vertex 35C as viewed in the illustration is referred to as a left side 36A, and a side connecting the top right vertex 35B and the bottom right vertex 35D is referred to as a right side 36B.

When the top side 34C or the bottom side 34D of the pattern image 30B or the left side 34A or the right side 34B of the pattern image 30B is equivalent to the second part corresponding to the first part, the top side 36C or the bottom side 36D of the pattern area 30C or the left side 36A or the right side 36B of the pattern area 30C is equivalent to a third part corresponding to the second part.

When detecting the pattern area 300 from the picked-up image 50, the first controller 150 determines whether two corners forming the pattern area 300 are detected. Since the pattern area 30C is an area in the picked-up image 50 formed by picking up the pattern image 30B, a plurality of corners are detected in the picked-up image 50. However, when the size of the pattern image 30B projected on the projection target 20 is larger than that of the projection target 20, a plurality of corners of the pattern image 30B may not be able to be detected from the picked-up image 50.

When the number of corners of the pattern image 30B detected from the picked-up image 50 is one or fewer, the first controller 150 instructs the projector 200 to reduce the size of the pattern image 30B projected on the projection target 20.

Also, preferably, the first controller 150 may detect two or more corners of the pattern image 30B from the picked-up image 50, and at least two corners may be on both sides of a side forming the outline of the pattern image 30B. More preferably, when a vertical stripe pattern having a bright part and a dark part is projected as a gray code pattern, in order to detect the number of panel pixels of the liquid crystal panel 245 to represent the width of the vertical stripe, the two corners of the pattern image 30B may be preferably the top left vertex 35A and the top right vertex 35B, or the bottom left vertex 35C and the bottom right vertex 35D. That is, preferably, the top side 34C or the bottom side 34D, which is a lateral side of the pattern image 30B, may be detected.

When two or more corners are detected from the picked-up image 50, the first controller 150 then specifies the number of pixels of the liquid crystal panel 245 used to draw the drawn image 30A. This number of pixels is referred to as the number of panel pixels. The first controller 150 acquires information about the panel resolution from the first storage 160 and specifies the number of panel pixels used for drawing the pattern image 30B, based on the acquired information.

The first controller 150 specifies the number of panel pixels of the side of the liquid crystal panel 245 corresponding to the side connecting two corners of the detected two or more corners. The specified number of panel pixels is equivalent to a first number of pixels. For example, when the top left vertex 35A and the top right vertex 35B of the pattern area 30C are detected from the picked-up image 50, the number of panel pixels of the top side 32C of the liquid crystal panel 245 corresponding to the top side 36C connecting these vertices is specified. When the top left vertex 35A and the bottom left vertex 35C of the pattern area 300 are detected from the picked-up image 50, the number of panel pixels of the left side 32A of the liquid crystal panel 245 corresponding to the left side 36A connecting these vertices is specified.

Next, the first controller 150 specifies the number of pixels of the corresponding side of the pattern area 30C. The number of pixels of a side forming the pattern area 30C is referred to as the number of image pickup pixels. The number of image pickup pixels of the side forming the pattern area 30C is equivalent to a second number of pixels.

For example, when the top left vertex 35A and the top right vertex 35B of the pattern area 30C are detected from the picked-up image 50, the number of image pickup pixels of the top side 36C of the pattern area 30C is detected. When the top left vertex 35A and the bottom left vertex 35C of the pattern area 30C are detected from the picked-up image 50, the number of image pickup pixels of the left side 34A of the pattern area 30C is detected.

Next, the first controller 150 calculates the ratio between the number of panel pixels of the liquid crystal panel 245 and the number of image pickup pixels of the pattern area 30C. For example, when the top left vertex 35A and the top right vertex 35B of the pattern area 30C are detected from the picked-up image 50, the ratio between the number of panel pixels of the top side 32C of the liquid crystal panel 245 and the number of image pickup pixels of the top side 36C of the pattern area 30C is calculated.

When the top left vertex 35A and the bottom left vertex 35C of the pattern area 30C are detected from the picked-up image 50, the ratio between the number of panel pixels of the left side 32A of the liquid crystal panel 245 and the number of image pickup pixels of the left side 34A of the pattern area 30C is calculated.

Figure 5:
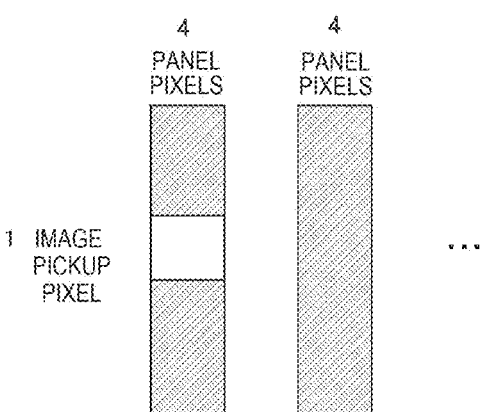
FIG. 5 shows a case where an image of four panel pixels is picked up by one pixel of an image pickup element.
Figure 6:
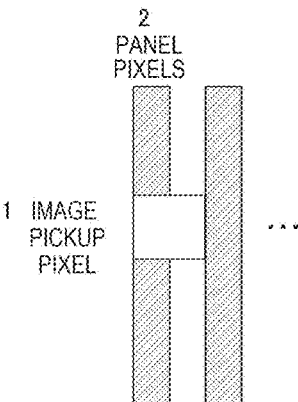
FIG. 6 shows a case where an image of two panel pixels is picked up by one pixel of an image pickup element.

FIG. 5 shows a case where an image of four panel pixels is picked up by one pixel of the image pickup element. FIG. 6 shows a case where an image of two panel pixels is picked up by one pixel of the image pickup element.

Next, based on the calculated ratio, the first controller 150 calculates an approximate value of the width of the stripe of the gray code pattern that is detectable with the resolution of the camera 300.

For example, it is assumed that each of the four vertices of the pattern area 30C can be detected from the picked-up image 50, and that the ratio between the number of panel pixels of the top side 32C of the liquid crystal panel 245 and the number of image pickup pixels of the top side 36C of the pattern area 30C is 4:1. When the four vertices of the pattern area 30C can be detected from the picked-up image 50, it can be determined that four pixels of the liquid crystal panel 245 can be disassembled to one pixel of the image pickup element. Therefore, the first controller 150 determines that up to a stripe pattern in which the width of one stripe is expressed by four panel pixels can be correctly determined.

Also, it is determined that the stripe of a stripe pattern having a width smaller than the four pixels of the liquid crystal panel 245 cannot be detected even when displayed.

When the ratio between the number of panel pixels of the top side 32C of the liquid crystal panel 245 and the number of image pickup pixels of the top side 36C of the pattern area 30C is 4:1, it is determined that up to eight panel pixels, which is the twice, can be disassembled to one pixel of the image pickup element, based on the sampling theorem.

For example, when the ratio between the number of panel pixels of the liquid crystal panel 245 and the number of image pickup pixels of the pattern area 30C is 4:1, the first controller 150 determines that the minimum width of the stripe of the gray code pattern that is detectable with the current resolution of the camera 300 is four.

The first controller 150 determines whether there is a gray code pattern having a stripe width smaller than the determined minimum width. When there is no gray code pattern having stripe width smaller than the determined minimum width, the first controller 150 projects all the gray code patterns stored in the first storage 160 onto the projection target 20 and starts the measurement by the gray code method.

When there is a gray code pattern having a stripe width smaller than the determined minimum width, the first controller 150 excludes the gray code pattern having a stripe width smaller than the determined minimum width, from the targets to be projected onto the projection target 20. For example, when the ratio between the number of panel pixels of the liquid crystal panel 245 and the number of image pickup pixels of the pattern area 30C is 2:1, as shown in FIG. 6, the gray code pattern is excluded from the targets to be projected onto the projection target 20.

Also, when a stripe pattern of a bright part or a dark part having the smallest width of the gray code patterns, which are stripe patterns, is defined as a first stripe pattern, and the minimum width is smaller than the width of the bright part or the dark part of the first stripe pattern, a message may be displayed on the display 130. This message is, for example, a message that, since a gray code pattern having a stripe width smaller than the minimum width is detected, the gray code pattern is excluded from the targets to be projected onto the projection target 20.

When the resolution of the image pickup element in the camera 300 can be changed, the first controller 150 may give an instruction to change the resolution of the camera. For example, when there is a gray code pattern having a stripe width smaller than the minimum width among the gray code patterns stored in the first storage 160 in advance, the first controller 150 instructs the camera 300 to increase the resolution of the camera 300.

When there is no gray code pattern having a width larger than twice the determined minimum width, the first controller 150 instructs the camera 300 to reduce the resolution of the camera 300.

Figure 7:
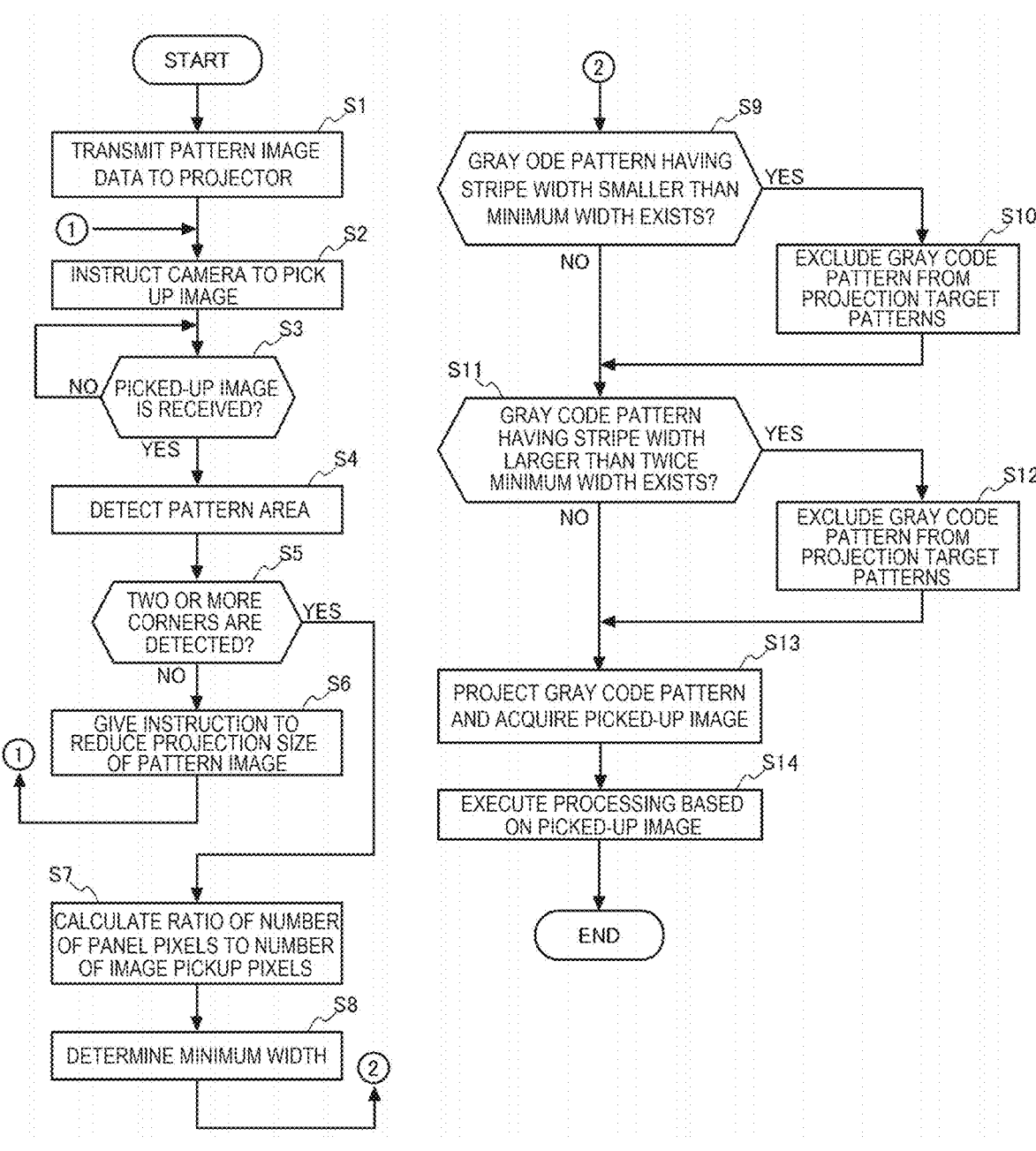
FIG. 7 is a flowchart illustrating an operation of an information processing device.

FIG. 7 is a flowchart showing the operation of the information processing device 100.

The operation of the information processing device 100 will be described with reference to the flowchart shown in FIG. 7.

First, the first controller 150 transmits the pattern image data to the projector 200 (step S1). Upon receiving the pattern image data from the information processing device 100, the projector 200 projects the pattern image 30B based on the received pattern image data onto the projection target 20.

Next, the first controller 150 instructs the camera 300 to pick up an image (step S2). The angle of view of the camera 300 is adjusted by the user in such a way that the projection target 20 is included in the angle of view of the camera 300. Upon receiving instruction to pick up an image from the information processing device 100, the camera 300 executes image pickup and thus generates the picked-up image 50. The camera 300 transmits the generated picked-up image 50 to the information processing device 100.

Next, the first controller 150 determines whether the picked-up image 50 is received from the camera 300 (step S3). When the picked-up image 50 is not received from the camera 300 (NO in step S3), the first controller 150 waits until receiving the picked-up image 50.

Upon receiving the picked-up image 50 from the camera 300 (YES in step S3), the first controller 150 detects the pattern area 30C, which is an area where the pattern image 30B is picked up, in the picked-up image 50 (step S4).

The first controller 150 determines whether two or more corners included in the pattern image 30B are detected from the picked-up image 50, based on the result of the detection of the pattern area 30C (step S5).

When two or more corners included in the pattern image 30B are not detected from the picked-up image 50 (NO in step S5), the first controller 150 instructs the projector 200 to reduce the projection size of the pattern image 30B (step S6), and proceeds to the processing of step S2.

When two or more corners included in the pattern image 30B are detected from the picked-up image 50 (YES in step S5), the first controller 150 calculates the ratio between the number of panel pixels and the number of image pickup pixels (step S7). The number of image pickup pixels is the number of image pickup pixels of the camera 300 used for the image pickup of the side of the pattern area 30C between the two corners detected in step S5. The number of panel pixels is the number of panel pixels of the side of the liquid crystal panel 245 corresponding to the side of the pattern area 30C. In this example, it is assumed that the number of image pickup pixels of the camera 300 used for the image pickup of the top side 36C of the pattern area 30C and the number of panel pixels of the top side 32C of the liquid crystal panel 245 are found.

Next, the first controller 150 calculates the ratio between the number of panel pixels of the top side 32C of the liquid crystal panel 245 and the number of image pickup pixels of the camera 300 used for the image pickup of the top side 36C of the pattern area 30C (step S7), that is, the first controller 150 divides the number of panel pixels of the top side 32C of the liquid crystal panel 245 by the number of image pickup pixels of the camera 300 used for the image pickup of the top side 36C.

Next, the first controller 150 determines the calculated ratio as the minimum width (step S8).

Next, the first controller 150 determines whether the gray code pattern used in the gray code method includes a gray code pattern having a stripe width smaller than the determined minimum width (step S9).

When there is a gray code pattern having a stripe width smaller than the determined minimum width (YES in step S9), the first controller 150 excludes the gray code pattern having the stripe width smaller than the minimum width from the targets to be projected onto the projection target 20 (step S10).

When there is no gray code pattern having a stripe width smaller than the determined minimum width (NO in step S9), or when the gray code pattern having the stripe width smaller than the determined minimum width is excluded (step S10), the first controller 150 proceeds to the next determination. When there is a gray code pattern having a stripe width larger than twice the minimum width (YES in step S11), the first controller 150 excludes the gray code pattern having the stripe width larger than twice the minimum width from the targets to be projected onto the projection target 20 (step S12).

When the first controller 150 excludes the gray code pattern having the stripe width larger than twice the minimum width (step S12), or when there is no gray code pattern having a stripe width larger than twice the minimum width (NO in step S11), the first controller 150 proceeds to the next processing.

Next, the first controller 150 causes the projector 200 to project a pattern excluding the excluded gray code pattern onto the projection target 20, and causes the camera 300 to execute image pickup to acquire a picked-up image (step S13).

Next, the first controller 150 executes processing based on the acquired picked-up image (step S14). The first controller 150 finds a transformation matrix for transforming the image pickup coordinates set in the picked-up image 50 picked up by the camera 300 into the panel coordinates of the liquid crystal panel 245 of the projector 200, based on the picked-up image. The first controller 150 may execute three-dimensional measurement based on the picked-up image.

6. Modification Examples

Modification Example 1

In the above embodiment, the first controller 150 causes the projector 200 to project the pattern image 30B formed in a single color such as white or black over the entire surface of the image.

In Modification Example 1, processing based on the gray code method is executed without projecting the pattern image 30B onto the projection target 20, and the line width of the gray code pattern projected onto the projection target 20 is gradually changed from a wide pattern to a narrow pattern. That is, the pattern image 30B projected on the projection target 20 by the projector 200 is a gray code pattern having one or a plurality of stripe patterns. When the second controller 250 draws the gray code pattern on the entire surface of the liquid crystal panel 245, the top side 32C or the bottom side 32D of the liquid crystal panel 245, or the left side 32A or the right side 32B of the liquid crystal panel 245, which is the first part, includes a plurality of bright parts or dark parts of the gray code pattern.

Then, the first controller 150 causes the camera 300 to pick up an image of the gray code pattern, and detects the number of image pickup pixels of the camera 300 picking up an image of the line width of the gray code pattern drawn on the liquid crystal panel 245. That is, the first controller 150 calculates the ratio between the number of panel pixels of the liquid crystal panel 245 on which the line width of the gray code pattern is drawn and the number of image pickup pixels of the camera 300 picking up an image of the line width of the gray code pattern. The first controller 150 decreases the line width of the gray code pattern projected onto the projection target 20 until the ratio of the number of panel pixels of the liquid crystal panel 245 to the number of image pickup pixels of the camera 300 becomes a predetermined ratio.

When the ratio of the number of panel pixels of the liquid crystal panel 245 to the number of image pickup pixels of the camera 300 is 1:1, that is, when an image of one pixel of the gray code pattern drawn on the liquid crystal panel 245 is picked up with one pixel of the number of image pickup pixels of the camera 300, the first controller 150 controls the projector 200 so as not to project the gray code pattern having a line width smaller than this onto the projection target 20.

Modification Example 2

The first controller 150 may change the content of the message displayed on the display 130 according to the minimum width. For example, when the resolution of the image pickup element of the camera 300 can be changed, the first controller 150 may give an instruction to change the resolution of the camera. For example, when there is a gray code pattern having a stripe width smaller than the minimum width among the gray code patterns stored in the first storage 160 in advance, the first controller 150 may cause the display 130 to display a message giving an instruction to increase the resolution of the camera 300. The first controller 150 may instruct the camera 300 to increase the resolution.

When there is no gray code pattern having a width larger than twice the determined minimum width, the first controller 150 may cause the display 130 to display a message giving an instruction to reduce the resolution of the camera 300. The first controller 150 may instruct the camera 300 to reduce the resolution.

Modification Example 3

Figure 8:
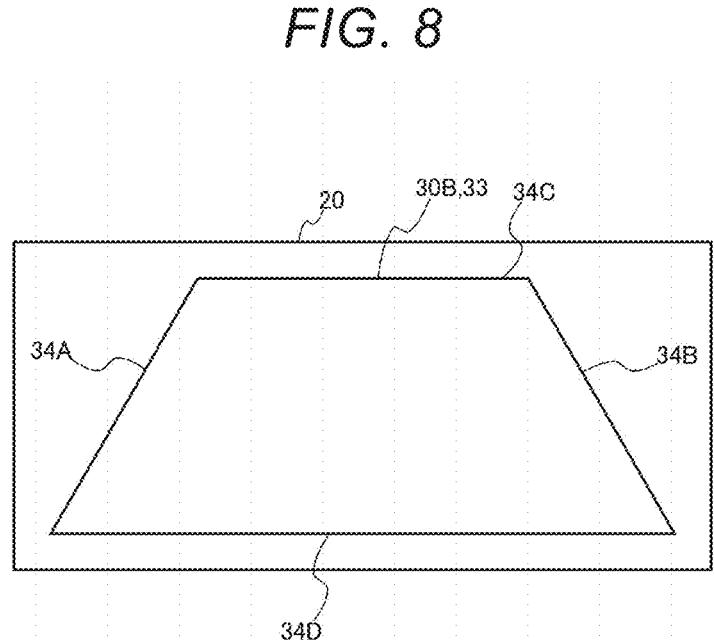
FIG. 8 shows a pattern image projected on a projection target.

FIG. 8 shows the pattern image 30B projected on the projection target 20.

Figure 9:
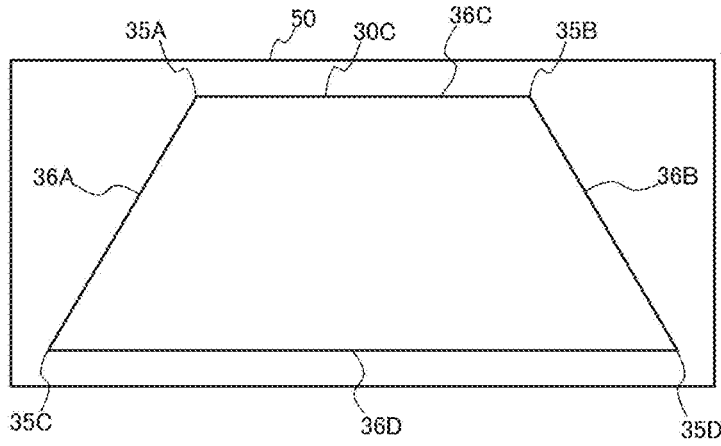
FIG. 9 shows a picked-up image picked up by a camera.

FIG. 9 shows the picked-up image 50 picked up by the camera 300.

When the shape of the pattern image 30B projected onto the projection target 20 by the projector 200 is distorted, the shape of the pattern image 30B picked up in the picked-up image 50 is distorted as well.

When the lengths of the top side 36C and the bottom side 36D of the pattern image 30B are substantially the same, as illustrated in FIG. 4, the first controller 150 may use either the top side 36C or the bottom side 36D for the number of pixels of the image pickup element picking up the pattern image 30B. However, when the lengths of the top side 36C and the bottom side 36D are different from each other, as illustrated in FIG. 9, the first controller 150 detects the number of pixels of the top side 36C having the shorter length, of the top side 36C and the bottom side 36D, as the number of image pickup pixels. The minimum limit value of the minimum width can be determined by calculating the minimum value of the number of image pickup pixels and determining the minimum width, based on the calculated minimum value.

Modification Example 4

In the above embodiment, when the stripe width of the gray code pattern is smaller than the minimum width, the gray code pattern having the stripe width smaller than the minimum width is excluded from the targets to be projected onto the projection target 20.

However, since the resolution of the camera 300 can be changed by changing the distance between the camera 300 and the projection target 20, when there is a gray code pattern having a stripe width smaller than the minimum width, a message for guiding the user to reduce the distance between the camera 300 and the projection target 20 may be displayed on the display 130.

When there is a gray code pattern having a stripe width larger than twice the minimum width, the first controller 150 may cause the display 130 to display a message for guiding the user to increase the distance between the camera 300 and the projection target 20.

Modification Example 5

In the above embodiment, when the stripe width of the gray code pattern is smaller than the minimum width, the gray code pattern having the stripe width smaller than the minimum width is excluded from the targets to be projected onto the projection target 20.

In addition, the first controller 150 may linearly interpolate the picked-up image received from the camera 300 and may interpolate the pixel value of a pixel where a wrong pixel value is detected.

7. Other Embodiments

The above embodiments and modification examples are preferred embodiments of the present disclosure. However, the present disclosure is not limited thereto, and various modifications can be made without departing from the spirit and scope of the present disclosure.

For example, in the above embodiment, a configuration in which the projection system 1 includes the information processing device 100, the projector 200, and the camera 300 is described as an example, but this embodiment is not limiting. For example, the camera 300 may be a built-in camera of the information processing device 100 or the projector 200.

In the above embodiment, a case where the information processing device 100 and the projector 200 are configured as separate bodies is described, but the projector 200 can be made to operate as the information processing device 100. That is, the second controller 250 of the projector 200 may be configured to execute the operation of the information processing device 100 illustrated in the flowchart of FIG. 7.

The processing elements in the flowchart illustrated in FIG. 7 are formed by dividing the processing according to the main processing contents in order to facilitate the understanding of the processing performed by the information processing device 100. The present disclosure is not limited by the way the processing is divided into the processing elements and the names of the processing elements illustrated in the flowchart of FIG. 7. Also, the processing performed by the information processing device 100 may be divided into more processing elements according to the processing contents, or one processing element may be divided to include more processing. Also, the order of the processing in the foregoing flowchart is not limited to the illustrated example.

The same applies to the processing elements performed by the projector 200.

Each functional unit of the information processing device 100 and the projector 200 represents a functional configuration achieved by a cooperation between hardware and software and is not limited to a specific form of implementation. Thus, hardware individually corresponding to the functional units need not necessarily be implemented, and one processor may execute a program to implement functions of a plurality of functional units. Also, in the above embodiment, a part of the functions realized by software may be realized by hardware, or a part of the functions realized by hardware may be realized by software.

Also, when the control method and the program according to the present disclosure are realized using a computer installed in the information processing device 100 or a computer installed in the projector 200, the program to be executed by the computer may be configured in the form of a recording medium. The program to be executed by the computer can also be configured in the form of a transmission medium that transmits the program. As the recording medium, a magnetic or optical recording medium or a semiconductor memory device can be used. Specifically, examples of the recording medium include a portable or stationary recording medium such as a flexible disc, an HDD, a CD-ROM (compact disc read-only memory), a DVD (digital versatile disk), a Blu-ray disc, a magneto-optical disc, a flash memory, or a card-type recording medium. The recording medium may be a nonvolatile storage device such as a RAM, a ROM, or an HDD that is an internal storage device provided in a server device. Blu-ray is a registered trademark.

8. Summary of Present Disclosure

The present disclosure will be summarized below in the form of appendices.

Appendix 1

A control method for a projection system is provided, the projection system including a projection device that includes a light modulator including a plurality of pixels and that projects one or a plurality of stripe patterns including a bright part and a dark part onto a projection target, and an image pickup device that picks up an image of the one or the plurality of stripe patterns projected on the projection target, the control method including: causing the light modulator to draw a drawn image including a first part having a first number of pixels; causing the projection device to project the drawn image as a projection image onto the projection target; causing the image pickup device to pick up the projection image including a second part corresponding to the first part and thus acquire a picked-up image; and determining a minimum width of the bright part or the dark part detectable by the image pickup device, based on the first number of pixels and a second number of pixels, which is a number of pixels of a third part corresponding to the second part of the projection image included in the picked-up image.

According to this configuration, the image pickup device picks up the projection image projected onto the projection target by the projection device and thus acquires the picked-up image, and the minimum width of the bright part or the dark part detectable by the image pickup device is determined, based on the first number of pixels and the second number of pixels of the projection image included in the picked-up image. Therefore, even when the user prepares the image pickup device, the minimum width of the bright part or the dark part detectable by the image pickup device can be determined, based on the first number of pixels and the second number of pixels. Therefore, the processing load on the user can be reduced. When finding the correspondence relationship between the pixels of the light modulator and the pixels of the image pickup device, the processing time can be reduced by not projecting, onto the projection target, the stripe pattern that cannot be determined in the picked-up image picked up by the image pickup device.

Appendix 2

The control method according to Appendix 1, wherein the projection image is a first image having only a first color and is the first image different from the one or plurality of stripe patterns.

According to this configuration, the first image having only the first color is projected as the projection image. Thus, the minimum width of the bright part or the dark part can be easily determined.

Appendix 3

The control method according to Appendix 2, wherein the first image included in the picked-up image includes a plurality of sides forming an outline of the first image and included in the picked-up image, and the third part is a first side, which is a shortest side of the plurality of sides.

According to this configuration, the minimum width is determined, based on the first number of pixels and the second number of pixels of the third part, which is the first side, and which is the shortest side of the plurality of sides of the first image. That is, since the minimum width is determined, based on the minimum value of the second number of pixels, the minimum limit value of the minimum width can be determined.

Appendix 4

The control method according to Appendix 3, wherein the first image includes a first corner, a second corner different from the first corner, and a side passing through the first corner and the second corner and forming the outline of the first image, the third part is the side, and the control method includes determining whether the first corner and the second corner are included in the picked-up image, and changing a size of the first image in such a way that both the first corner and the second corner are included in the picked-up image, when it is determined that the first corner or the second corner is included in the picked-up image.

According to this configuration, the size of the first image is changed in such a way that an image of the first corner, the second corner, and the side passing through the first corner and the second corner and forming the outline of the first image is picked up in the projection image. Thus, the size of the first image can be changed in such a way that the minimum width of the bright part or the dark part can be determined, based on the first number of pixels and the second number of pixels.

Appendix 5

The control method according to Appendix 1, wherein the projection image includes the one or plurality of stripe patterns, and the first part includes a bright part or a dark part.

According to this configuration, one or a plurality of stripe patterns are projected as the projection image, and the minimum width is determined, based on the number of pixels of the bright part or the dark part included in the first part and the number of pixels of the third part formed by picking up an image of the second part of the projection image in which the first part is projected. Therefore, one or a plurality of stripe patterns can also be used as the projection image for determining the minimum width.

Appendix 6

The control method according to Appendix 1, further including displaying a first message, when a stripe pattern of the bright part or the dark part having a smallest width of the plurality of stripe patterns is defined as a first stripe pattern and the minimum width is smaller than a width of the bright part or the dark part of the first stripe pattern.

According to this configuration, when the minimum width is smaller than the width of the bright part or the dark part of the first stripe pattern, the first message is displayed. Therefore, a stripe pattern with which the correspondence relationship between the pixels of the light modulator and the pixels of the image pickup device cannot be found can be suppressed from being projected onto the projection target.

Appendix 7

The control method according to Appendix 6, further including changing a content of the first message according to the minimum width.

According to this configuration, the content of the first message is changed according to the minimum width. Therefore, the user is enabled to grasp the stripe pattern detectable in the picked-up image picked up by the image pickup device.

Appendix 8

The control method according to Appendix 1, wherein a number of the plurality of stripe patterns projected from the projection device is changed according to a result of determining the minimum width.

According to this configuration, the number of the plurality of stripe patterns projected from the projector is changed according to the result of determining the minimum width. Thus, the stripe pattern corresponding to the minimum width detectable in the picked-up image picked up by the image pickup device can be projected.

Appendix 9

A projection system includes: a projection device that includes a light modulator including a plurality of pixels and that projects one or a plurality of stripe patterns including a bright part and a dark part onto a projection target; and an image pickup device that picks up an image of the one or the plurality of stripe patterns projected on the projection target, wherein the light modulator draws a drawn image including a first part having a first number of pixels, the projection device projects the drawn image as a projection image onto the projection target, the image pickup device picks up the projection image including a second part corresponding to the first part and thus acquires a picked-up image, and a minimum width of the bright part or the dark part detectable by the image pickup device is determined, based on the first number of pixels and a second number of pixels, which is a number of pixels of a third part corresponding to the second part of the projection image included in the picked-up image.

According to this configuration, the image pickup device picks up the projection image projected onto the projection target by the projection device and thus acquires the picked-up image, and the minimum width of the bright part or the dark part detectable by the image pickup device is determined, based on the first number of pixels and the second number of pixels of the projection image included in the picked-up image. Therefore, even when the user prepares the image pickup device, the minimum width of the bright part or the dark part detectable by the image pickup device can be determined, based on the first number of pixels and the second number of pixels. Therefore, the processing load on the user can be reduced. When finding the correspondence relationship between the pixels of the light modulator and the pixels of the image pickup device, the processing time can be reduced by not projecting, onto the projection target, the stripe pattern that cannot be determined in the picked-up image picked up by the image pickup device.

Appendix 10

A non-transitory computer-readable storage medium storing a program is provided, the program causing a processor installed in a projection device that includes a light modulator including a plurality of pixels and that projects one or a plurality of stripe patterns including a bright part and a dark part onto a projection target, to execute: causing the light modulator to draw a drawn image including a first part having a first number of pixels; projecting the drawn image as a projection image onto the projection target; acquiring, from an image pickup device, a picked-up image formed by picking up the projection image including a second part corresponding to the first part; and determining a minimum width of the bright part or the dark part detectable by the image pickup device, based on the first number of pixels and a second number of pixels, which is a number of pixels of a third part corresponding to the second part of the projection image included in the picked-up image.

According to this configuration, the image pickup device picks up the projection image projected onto the projection target by the projection device and thus acquires the picked-up image, and the minimum width of the bright part or the dark part detectable by the image pickup device is determined, based on the first number of pixels and the second number of pixels of the projection image included in the picked-up image. Therefore, even when the user prepares the image pickup device, the minimum width of the bright part or the dark part detectable by the image pickup device can be determined, based on the first number of pixels and the second number of pixels. Therefore, the processing load on the user can be reduced. When finding the correspondence relationship between the pixels of the light modulator and the pixels of the image pickup device, the processing time can be reduced by not projecting, onto the projection target, the stripe pattern that cannot be determined in the picked-up image picked up by the image pickup device.

What is claimed is:

1. A control method for a projection system, the projection system comprising a projection device that includes a light modulator including a plurality of pixels and that projects one or a plurality of stripe patterns including a bright part and a dark part onto a projection target, and an image pickup device that picks up an image of the one or the plurality of stripe patterns projected on the projection target, the control method comprising:

causing the light modulator to draw a drawn image including a first part having a first number of pixels;

causing the projection device to project the drawn image as a projection image onto the projection target;

causing the image pickup device to pick up the projection image including a second part corresponding to the first part and thus acquire a picked-up image; and determining a minimum width of the bright part or the dark part detectable by the image pickup device, based on the first number of pixels and a second number of pixels, which is a number of pixels of a third part corresponding to the second part of the projection image included in the picked-up image.

2. The control method according to claim 1, wherein the projection image is a first image having only a first color and is the first image different from the one or plurality of stripe patterns.

3. The control method according to claim 2, wherein the first image included in the picked-up image includes a plurality of sides forming an outline of the first image and included in the picked-up image, and the third part is a first side, which is a shortest side of the plurality of sides.

4. The control method according to claim 3, wherein the first image includes a first corner, a second corner different from the first corner, and a side passing through the first corner and the second corner and forming the outline of the first image, the third part is the side, and the control method comprises:

determining whether the first corner and the second corner are included in the picked-up image; and changing a size of the first image in such a way that both the first corner and the second corner are included in the picked-up image, when it is determined that the first corner or the second corner is included in the picked-up image.

5. The control method according to claim 1, wherein the projection image includes the one or plurality of stripe patterns, and the first part includes the bright part or the dark part.

6. The control method according to claim 1, further comprising:

displaying a first message, when a stripe pattern of the bright part or the dark part having a smallest width of the plurality of stripe patterns is defined as a first stripe pattern and the minimum width is smaller than a width of the bright part or the dark part of the first stripe pattern.

7. The control method according to claim 6, further comprising:

changing a content of the first message according to the minimum width.

8. The control method according to claim 1, wherein a number of the plurality of stripe patterns projected from the projection device is changed according to a result of determining the minimum width.

9. A projection system comprising:

a projection device that includes a light modulator including a plurality of pixels and that projects one or a plurality of stripe patterns including a bright part and a dark part onto a projection target; and an image pickup device that picks up an image of the one or the plurality of stripe patterns projected on the projection target, wherein the light modulator draws a drawn image including a first part having a first number of pixels, the projection device projects the drawn image as a projection image onto the projection target, the image pickup device picks up the projection image including a second part corresponding to the first part and thus acquires a picked-up image, and a minimum width of the bright part or the dark part detectable by the image pickup device is determined, based on the first number of pixels and a second number of pixels, which is a number of pixels of a third part corresponding to the second part of the projection image included in the picked-up image.

10. A non-transitory computer-readable storage medium storing a program, the program causing a processor installed in a projection device that includes a light modulator including a plurality of pixels and that projects one or a plurality of stripe patterns including a bright part and a dark part onto a projection target, to execute:

causing the light modulator to draw a drawn image including a first part having a first number of pixels;

projecting the drawn image as a projection image onto the projection target;

acquiring, from an image pickup device, a picked-up image formed by picking up the projection image including a second part corresponding to the first part; and determining a minimum width of the bright part or the dark part detectable by the image pickup device, based on the first number of pixels and a second number of pixels, which is a number of pixels of a third part corresponding to the second part of the projection image included in the picked-up image.

* * * * *